Jan. 5, 1937.　　　J. R. HUGHES　　　2,066,836
ROAD AND RAILWAY VEHICLE
Filed May 26, 1934　　　6 Sheets-Sheet 3
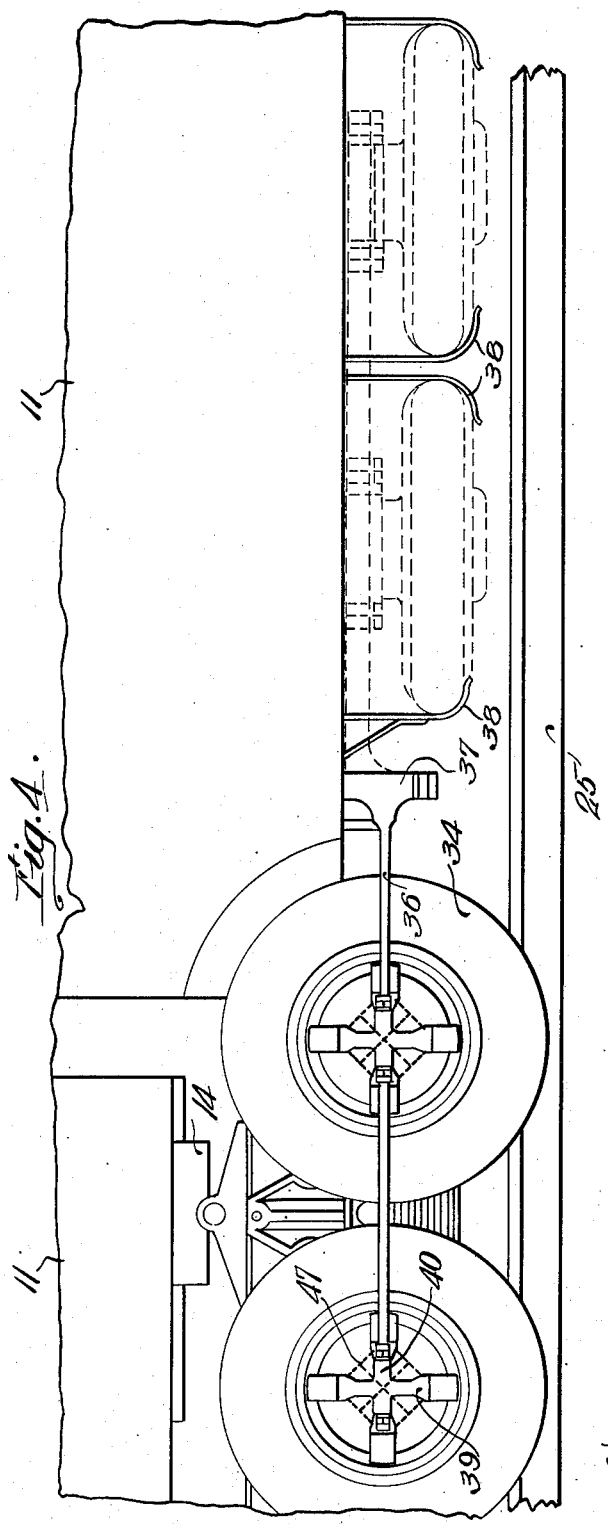
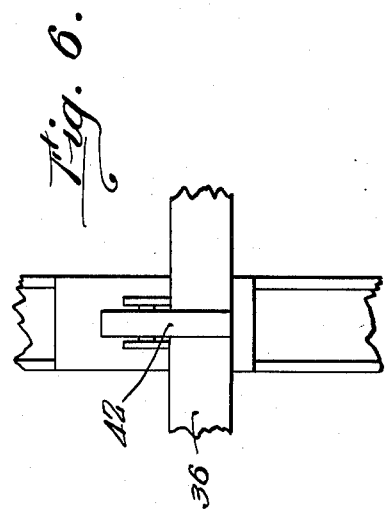
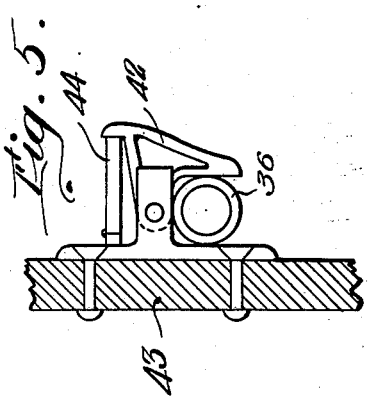
Inventor.
John R. Hughes Jan. 5, 1937.   J. R. HUGHES   2,066,836
ROAD AND RAILWAY VEHICLE
Filed May 26, 1934   6 Sheets-Sheet 4

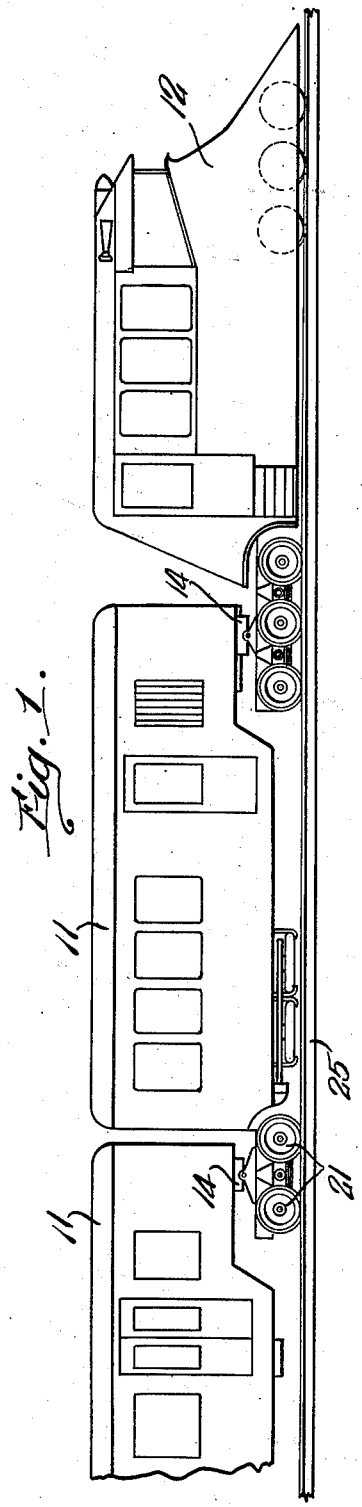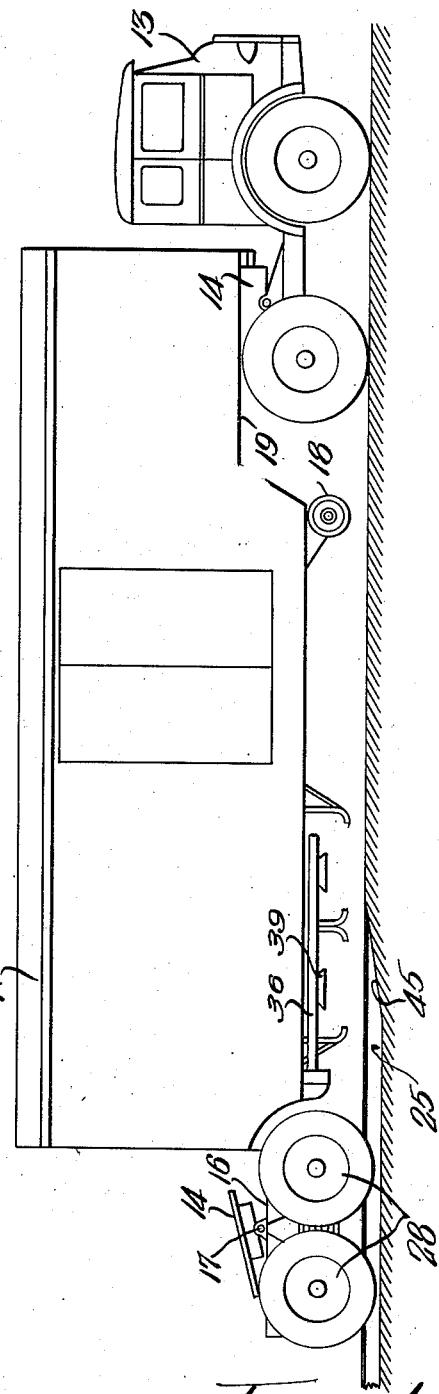

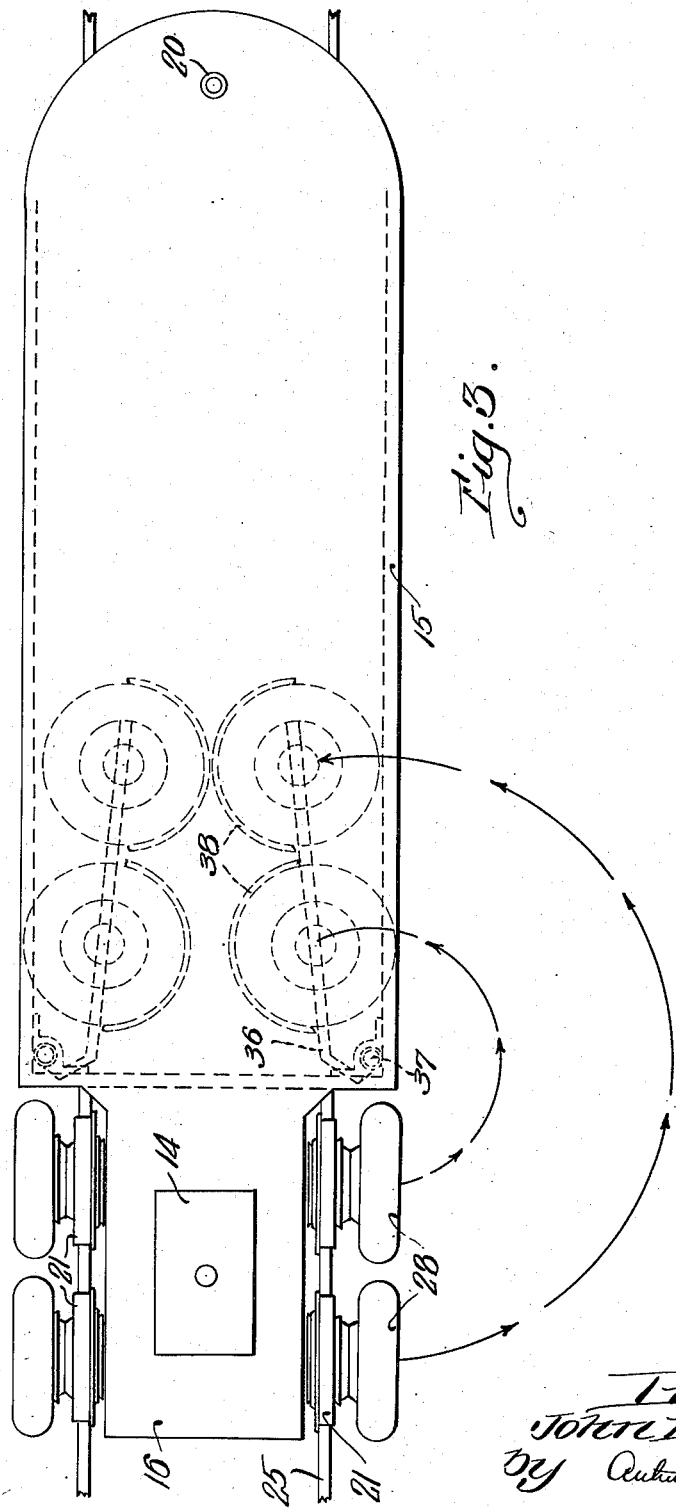

Inventor.
John R. Hughes
by Arthur D. Thomson
Atty.

Jan. 5, 1937.   J. R. HUGHES   2,066,836
ROAD AND RAILWAY VEHICLE
Filed May 26, 1934   6 Sheets-Sheet 6

Inventor.
John R. Hughes
by Auten D. Thomson
Atty.

Patented Jan. 5, 1937

2,066,836

UNITED STATES PATENT OFFICE 2,066,836

ROAD AND RAILWAY VEHICLE

John R. Hughes, Boston, Mass.

Application May 26, 1934, Serial No. 727,715

7 Claims. (Cl. 105—215)

This invention relates to vehicles for both highway and railway transportation of commodities, merchandise or other goods which are normally hauled by trucks or by railroad freight cars. The principal purpose of the invention is to reduce the cost of freight or express shipments by providing a car, trailer or other vehicle which may readily be converted for efficient and economical use on the roads or on the rails, so that the goods may be quickly and safely transported from the consignor direct to the consignee, thus eliminating the delay and expense incident to repeated handlings of the merchandise by present systems of freight shipments by rail while preserving the economies of freight-train delivery to distant points on a railroad line.

To this end, I have devised a transportation system which combines the advantages of existent highway and railway transport facilities, and eliminates to a large extent their inherent and well-known disadvantages; which will effect a very substantial saving in the cost of delivery of goods of all types and descriptions, including mail and perishable products which require speedy shipment; which will reduce loss by theft or accident; and which will assist in preserving the condition of the Nation's highways and in restoring to its railroads much of the revenue which has been diverted to motor truck systems.

While the equipment for this system includes the provision of a high-powered railroad tractor for hauling a train of the improved freight cars or trailers over the rails, and a road tractor (or combination road and rail tractor) for conveying the indivdual trailers over the streets, the present invention pertains more particularly to the construction of the trailers and to the convertible wheels which adapt the vehicle for its desired purpose. One object of the invention is, therefore, to provide a trailer-type freight car which affords maximum capacity consistent with the limits imposed by law to the size of road vehicles, and which may be readily attached to the road or rail tractor (or coupled to a steam locomotive), as well as to other and similar trailers in making up a freight train. This object is satisfied by furnishing a car having a coupling element located beneath its under-cut front end, and adapted to engage a complemental coupling on a tractor or on another car; and a rearwardly extending chassis portion supported by the convertible wheels and carrying a complemental coupling element, such as a "fifth wheel", to which the front of a second and similar car may be attached.

Hence, each car requires but one set of permanent supporting wheels, the front end of a detached car being supported by one or more temporary drop wheels while it is being loaded or unloaded. The permanent set may comprise two or more pairs of dual wheels if desired. The bodies of the cars will vary in type and dimensions according to the character of the freight for which they are designed, but all types may be mounted on the same standard chassis and it is evident that this arrangement provides the maximum of storage space relative to the over-all length of the unit or a train of connected units. Each car may be provided with the usual equipment normally carried by present railroad freight cars, as well as with such accessories as are required for road trailers.

Another object of this invention is to provide a set of improved convertible wheels for said cars, each duplex unit comprising a flanged rail wheel substantially conforming to railroad standards, and a road wheel preferably having a pneumatic tire the diameter of which is greater than that of the rail wheel. The road wheel is detachably secured to the rail wheel, and means are provided for easily and quickly demounting the road wheel and mechanically transferring it to a storage rack under the chassis of the car. This aspect is particularly important to the efficient utilization of a convertible wheel of this type, for it ensures rapid removal or replacement of the demountable wheels and avoids much of the manual labor which would otherwise be necessary.

These and other features of the improved apparatus will be more fully described in connection with the accompanying drawings illustrating recommended embodiments of the invention; and will be pointed out in the appended claims.

In the drawings,

Fig. 1 is a side elevation of the improved road-rail cars attached to a tractor for rail transport;

Fig. 2 is a side view of one of the cars coupled to a road tractor and about to be transferred from the rails to the road surface;

Fig. 3 is a plan view of a typical car chassis, indicating the storage racks for the road wheels and the conveying arm by which they are removed and remounted;

Fig. 4 is a fragmentary elevation of the road wheels and demounting equipment;

Figs. 5 and 6 are side and end views of a latch for holding the demounting arm;

Figure 7:
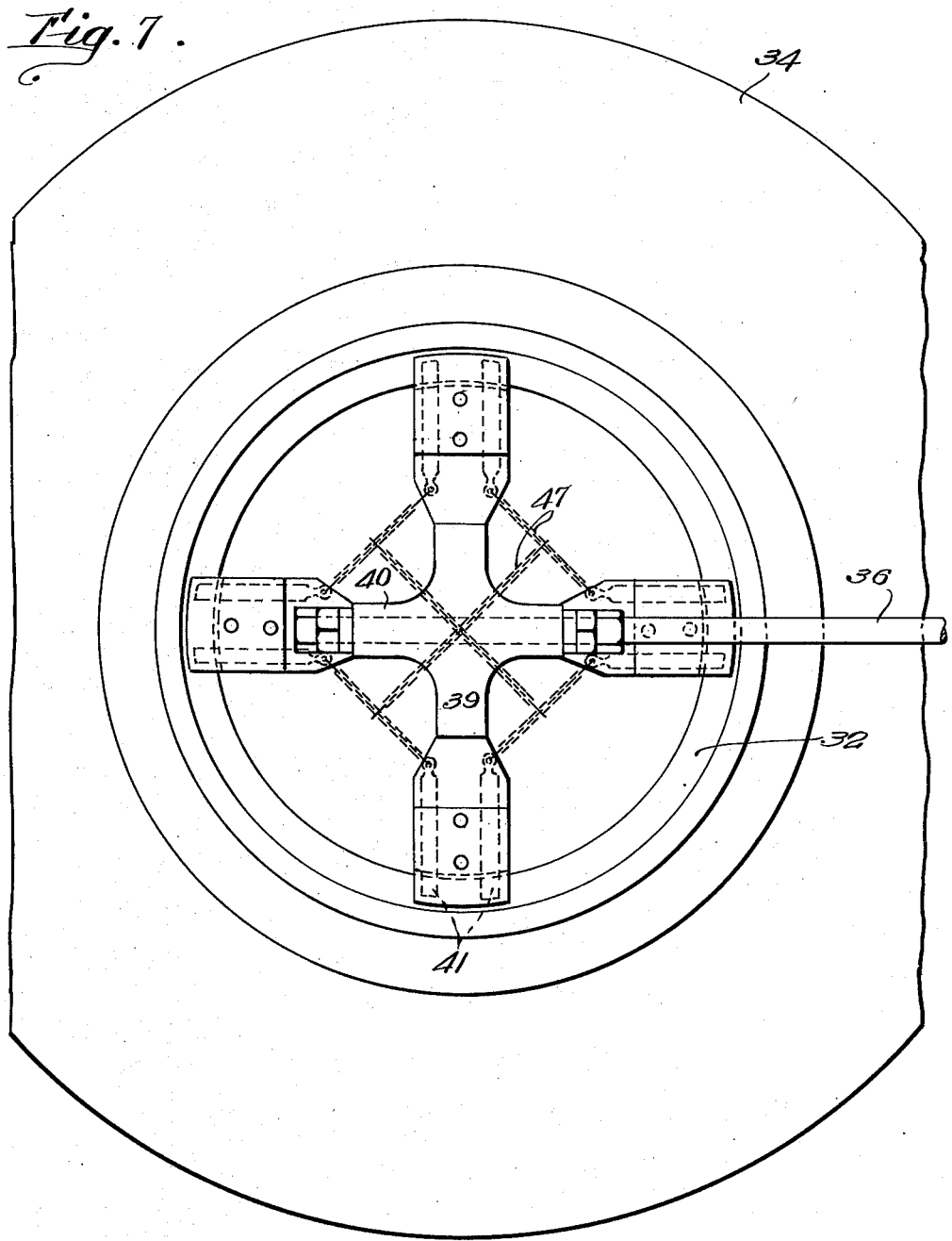
Fig. 7 is an enlarged elevation of one of the road wheels with the demounting arm attached thereto.

In the particular embodiment chosen for the purpose of illustration in Figs. 1 to 8, the roadrail equipment comprises an indefinite series of trailers exemplified by the types shown at 11 (Figs. 1, 2, and 4), each so constructed that it may be conveniently coupled to another trailer, to a rail tractor 12, or to a road tractor 13; and each having one or more sets of dual or convertible wheels adapting it for travel upon the rails or over the road. The rail tractor 12 and road tractor 13 may be of any standard or suitable construction, in so far as the present invention is concerned, but each should have a rear dolly truck or projecting chassis equipped with a so-called "fifth wheel" 14 of common type, so that the special trailers may be properly connected thereto. The rail tractor may be powered by a Diesel engine, and the road tractor by a gasoline engine, in accordance with common practice.

While the bodies of the trailers may differ in construction and appearance according to their intended service, the chassis upon which they are suitably mounted are substantially identical and of the general character shown in Fig. 3, it being understood that the structural details are not of the essence of this invention, except as they may be particularly described and claimed herein. The chassis comprises a rigid steel frame 15 upon which the trailer body is disposed, and a semi-dolly truck extending rearwardly of the body 11 and frame proper 15. This truck has a platform 16 upon which the bottom member 14 of the fifth wheel is securely anchored by a suitable pivoted connection 17, and includes a tandem of four dual wheels which support the front end of the next adjacent trailer as well as the rear end of the chassis of which they form a permanent part.

The chassis carries a drop wheel 18 (Fig. 2) of common construction, which may be lowered to support the forward part of the trailer until it is coupled to a tractor or another trailer. The front end of the frame 15 is upwardly offset, as indicated at 19, and is provided with the upper coupling member 20 of the fifth wheel, whereby the trailer may be attached to another like unit or to a road or rail tractor, as aforesaid. It is thus apparent that each trailer has but one truck or set of supporting wheels, which project rearwardly therefrom, and that its forward end is undershot to accommodate the truck of a complemental unit. This arrangement is adequate for the purpose, and materially lessens the overall length of the train while also adapting the vehicle for road and rail use as an individual unit or part of a connected series.

Figure 8:
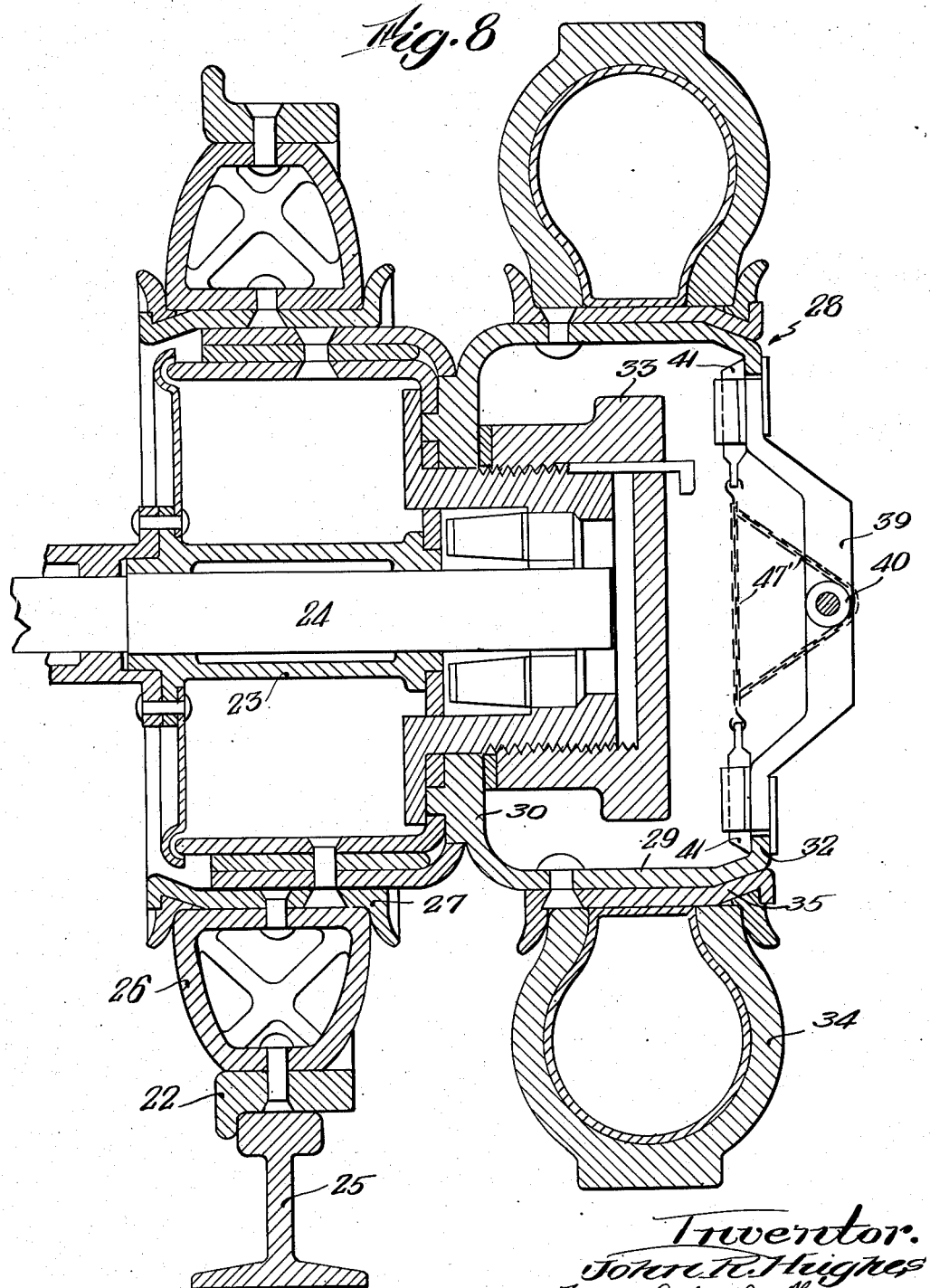
Fig. 8 is a section view of the dual wheel of Fig. 7.

The dual or convertible wheels are mounted upon standard, "dead" axles which may be equipped with any suitable type of spring suspension in accordance with general practice; and are best shown in Figs. 3, 4, 7, and 8. The rail wheels, indicated generally at 21 have the standard flanged tire 22, suitably connected to a hub 23 journaled on the axle 24, so that they are adapted for the standard rails 25. In Fig. 8, the tires are attached to a rim 26 which is mounted on a wheel 27.

The road wheels 28 are mounted concentric with the rail wheels and upon the same axle, but are of greater diameter than the rail wheels so that the latter will not strike the road surface when the trailer is traveling over the streets. The wheel shown in Fig. 8 has a cylindrical body member 29 provided with a rear flange 30 abutting the body of the rail wheel, and a front flange 32 which is engaged by a member of the demounting arm hereinafter described. A nut 33 holds the road wheel in place, and is removable through the front opening defined by flange 32. The pneumatic tire 34 is suitably mounted on the rim 35 secured to the body 29 of the wheel.

One of the features of this invention is the provision of a demounting arm 36 having means for engaging the road wheel, preferably at the flange 32, and adapted to swing the wheel bodily away from the rail wheel and deposit it (or a pair of them) in a rack provided beneath the frame 15. The arm 36 is pivoted to the frame at 37, and the pivotal connection is preferably of the spiral type so that the arm is lifted as it is swung toward the chassis rack 38.

Each arm 36 is provided with a pair of spiders 39 arranged to engage the two road wheels, and these spiders preferably have a sleeve portion 40 which is journaled on the arm or lever 36 so that the spiders may rotate thereon. The ends of the spider arms carry one or more spring-actuated bolts 41 which lock behind the wheel flange 32 and thus separably connect the wheel to the arm 36. The spider is thus attached after the wheel-retaining nut or nuts have been loosened or removed, consequently the road wheel or wheels may readily be swung away from the rail wheels. The bolts 41 are pulled from locking position by chains 47.

Because of the rotatable sleeve 40 the wheels may also be tilted to a horizontal position beneath the supporting lever 36, and thus inserted into the complemental racks 38. In this position, the arm 36 is secured by a latch 42 of the type shown in Figs. 5 and 6, pivotally mounted on a strut 43 of the frame 15, and held in closed position by a positive locking member 44.

It will be understood that the road wheels are swung into the retaining racks when the vehicle is to be used upon the rails, and may be replaced whenever the car is ready for road travel, as indicated in Fig. 2. As the road tractor 13 pulls the trailer 11 forwardly, the road wheels 28 strike a short incline or ramp 45 formed beside the rails 25, and thus lift the rail wheels off the rails. It is apparent that such inclines may readily be provided at intermediate or rural stations, as well as at terminals, so that there is no necessity for supplemental terminal equipment, such as cranes or bridging devices, to move the trailer from rail to road or vice versa. It is only necessary to provide a rail-level surface for the road tractor, and an incline or ramp of the character illustrated, to permit transfers at way stations; and this can be accomplished very easily, owing to the nature of the trailers herein described and the wheel demounting arm just explained.

It is evident from the foregoing that roadrail equipment of this character will be of great benefit to the public and to the railroads because of the many advantages of door to door freight delivery (in sealed cars if desired) and the substantial savings in the cost of freight deliveries. This new system contemplates the provision of a complete and balanced line of transportation equipment which can be manufactured and maintained in operating condition at minimum cost without sacrifice of operating efficiency.

Figure 9:
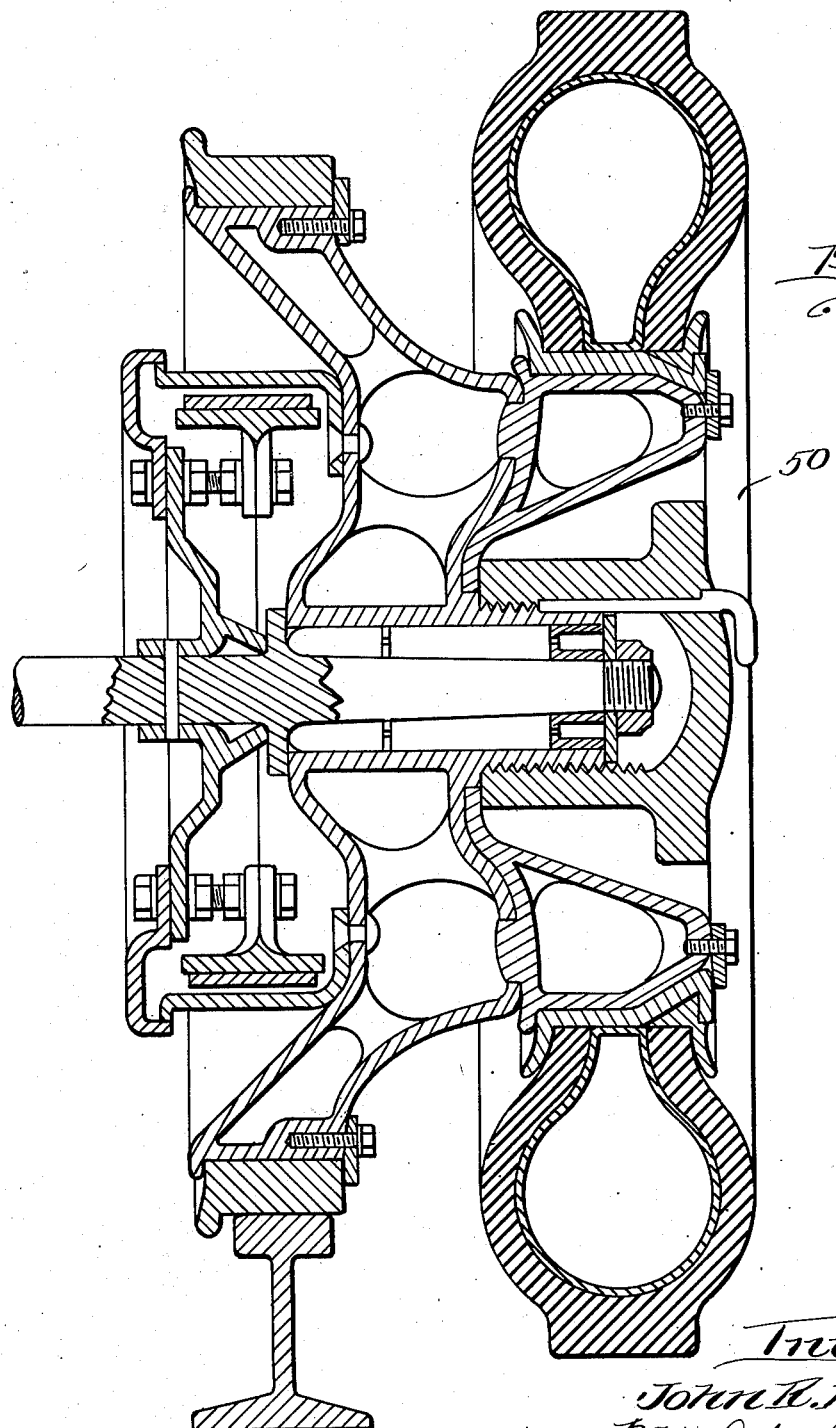
Fig. 9 is a similar view showing a modified wheel construction, primarily for use on a combination tractor.

As pointed out above, the mechanical design and construction of the units may be modified and varied to suit particular purposes without departing from the essence of this invention as defined in the following claims. For example, the modified wheel shown in Fig. 9 illustrates one variation in the construction of a suitable convertible wheel. This wheel is primarily adapted for use upon an amphibian tractor which may be employed on the road as well as on the rails. Such tractors are usually not equipped with the demounting apparatus above described, so that the road wheel 50 is removed by hand.

I claim:

1. A vehicle for rail and road travel comprising a chassis, flanged rail wheels therefor, road wheels detachably secured to the rail wheels, and a demounting arm pivotally connected to the chassis and having means engageable with a road wheel for swinging the road wheel and conveying it beneath the chassis, said engaging means being rotatable relative to the axis of the arm so that the wheel may be turned to horizontal position.

2. A vehicle for rail and road travel comprising a chassis, flanged rail wheels therefor, road wheels detachably secured to the rail wheels, a demounting arm pivotally connected to the chassis, and a member pivoted to the arm and adapted to engage a road wheel for swinging the road wheel away from the rail wheel and conveying it beneath the chassis, said member being rotatable on the arm so that the wheel may be turned to horizontal position, a rack located beneath the chassis for receiving the wheel, and means for holding the wheel in said rack.

3. A vehicle for rail and road travel comprising a chassis, flanged rail wheels therefor, road wheels detachably secured to the rail wheels, a demounting arm pivotally connected to the chassis and pivotally engageable with a road wheel for simultaneously swinging and lifting the road wheel and conveying it beneath the chassis, and a rack mounted beneath the chassis for receiving said wheel, the wheel being rotatable on its arm so that it may be turned to horizontal position for insertion in said rack.

4. In combination with a vehicle having a rail wheel and a road wheel detachably connected to the rail wheel in concentric relation, a demounting arm for removing the road wheel, means for pivotally connecting the arm to the vehicle so that it may swing horizontally toward the wheel, and means at the free end of the arm for separably engaging the road wheel, said engaging means including a rotatable sleeve so that the wheel may be turned to horizontal position while it is being swung away from the rail wheel.

5. In combination with a vehicle having a rail wheel and a road wheel detachably connected to the rail wheel in concentric relation, a demounting arm for removing the road wheel, a spiral spindle for pivotally connecting the arm to the vehicle so that it may swing horizontally toward the wheel, means at the free end of the arm for separably engaging the road wheel, said engaging means including a sleeve rotatable on said arm so that the wheel may be turned to horizontal position while it is being swung away from the rail wheel, a rack located under the vehicle for receiving the horizontally disposed wheel, and a latch for holding the wheel in said rack.

6. In combination with a vehicle having a rail wheel and a road wheel detachably connected to the rail wheel in concentric relation, a demounting arm for removing the road wheel, means pivotally connecting the arm to the vehicle so that it may swing horizontally toward the wheel, and means at the free end of the arm for separably engaging the road wheel, the road wheel having an annular flange, and said means including spring-actuated bolts engaging said flange.

7. In combination with a vehicle having a rail wheel and a road wheel detachably connected to the rail wheel in concentric relation, a demounting arm for removing the road wheel, means pivotally connecting the arm to the vehicle so that it may swing horizontally toward the wheel, and means at the free end of the arm for separably engaging the road wheel, the road wheel having an annular flange, and said means including spring-actuated bolts engaging said flange, and a sleeve rotatable on said arm so that the wheel may be swung to horizontal position.

JOHN R. HUGHES.